United States Patent
David

(10) Patent No.: US 8,260,303 B2
(45) Date of Patent: Sep. 4, 2012

(54) INDICATION OF CONTENT OF MESSAGE ELEMENT

(75) Inventor: Philip Hole David, Southampton (GB)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 511 days.

(21) Appl. No.: 12/225,676

(22) PCT Filed: Mar. 19, 2007

(86) PCT No.: PCT/GB2007/050131
§ 371 (c)(1),
(2), (4) Date: Jan. 28, 2009

(87) PCT Pub. No.: WO2007/110659
PCT Pub. Date: Oct. 4, 2007

(65) Prior Publication Data
US 2009/0197602 A1 Aug. 6, 2009

(30) Foreign Application Priority Data
Mar. 27, 2006 (GB) .................................. 0606071.9

(51) Int. Cl.
*H04Q 7/20* (2006.01)
(52) U.S. Cl. ......... 455/438; 455/436; 455/466; 370/331
(58) Field of Classification Search .................. 455/438, 455/439, 436, 466; 370/331; 709/200
See application file for complete search history.

(56) References Cited

U.S. PATENT DOCUMENTS

| | | | |
|---|---|---|---|
| 7,146,636 B2 | 12/2006 | Crosbie | |
| 7,333,822 B2* | 2/2008 | Laumen et al. | 455/466 |
| 7,876,729 B1 | 1/2011 | Grilli | |
| 2004/0008723 A1 | 1/2004 | Uchida et al. | |
| 2004/0248575 A1* | 12/2004 | Rajala et al. | 455/436 |
| 2005/0004916 A1* | 1/2005 | Miller et al. | 707/10 |
| 2005/0232273 A1 | 10/2005 | Suzuki | |
| 2005/0255872 A1* | 11/2005 | Lundell et al. | 455/522 |
| 2005/0261017 A1* | 11/2005 | Vaittinen et al. | 455/522 |
| 2006/0099973 A1* | 5/2006 | Nair et al. | 455/461 |
| 2006/0133315 A1* | 6/2006 | Eriksson et al. | 370/331 |
| 2007/0033527 A1* | 2/2007 | Michl | 715/709 |
| 2011/0003600 A2* | 1/2011 | Beckmann et al. | 455/455 |

FOREIGN PATENT DOCUMENTS

| | | |
|---|---|---|
| CN | 1437819 A | 8/2003 |
| JP | 2003-529248 | 9/2003 |
| JP | 2004-514383 | 5/2004 |
| JP | 2005-269348 | 9/2005 |
| JP | 2005533413 | 11/2005 |
| RU | 2147794 | 4/2000 |

(Continued)

OTHER PUBLICATIONS

"Handover-Proceeding with CS Handover," 3GPP TSG GERAN#2 28bis, Mar. 21, 2008, retrieved from www.3gpp.org/ftp/tsg_geran/WG2_Protocol_Aspects/GERAN2_28bis_Paris/Docs/ on Apr. 25, 2007, 6 pp.

(Continued)

*Primary Examiner* — Danh Le
(74) *Attorney, Agent, or Firm* — Staas & Halsey LLP

(57) ABSTRACT

By providing an indicator outside a message element the content of the message element is indicated. This is particularly applicable to indication of a dual transfer mode handover command.

8 Claims, 2 Drawing Sheets

FOREIGN PATENT DOCUMENTS

| | | |
|---|---|---|
| RU | 2172071 | 8/2001 |
| WO | WO95/35635 | 12/1995 |
| WO | WO97/25827 | 7/1997 |
| WO | 01/50701 A2 | 7/2001 |

OTHER PUBLICATIONS

"Message and Containers to be used for DTM Handover," 3GPP TSG GERAN#24bis, May 23, 2005, retrieved from www.3gpp.org/ftp/tsg_geran/Wg2_Protocol_Aspects/GERAN2_24bis_Quebec/Docs/ on Sep. 20, 2006, 7 pp.

"Enhanced DTM Handover Issues" 3GPP TSG GERAN #25, Jun. 20, 2005, pp. 1-4.

"DTM Handover-Parallel CS and PS Handovers," 3GPP TSG GERAN#24bis, May 23, 2005, retrieved from URL:http://www.3gpp.org/ftp/tsg_geran/Wg2_Protocol_Aspects/GERAN2_24bis_Quebec/Docs/ on Sep. 20, 20067 pp. 1-8.

3rd Generation Partnership Project; Technical Specification Group GSM/EDGE Radio Access Network; Mobile Switching Centre—Base Station System (MSC-BSS) interface; Layer 3 specification (Release 7); 3GPP TS 48.008 V7.4.1; Feb. 2006; pp. 1-166.

International Search Report mailed Jun. 19, 2007 in PCT/GB2007/050131.

* cited by examiner

INDICATION OF CONTENT OF MESSAGE ELEMENT

CROSS REFERENCE TO RELATED APPLICATIONS

This application is based on and hereby claims priority to United Kingdom Patent Application No. 0606071.9 filed on Mar. 27, 2006 and United Kingdom Patent Application No. 0704072.8 filed on Mar. 2, 2007, the contents of which are hereby incorporated by reference.

BACKGROUND

This invention relates to a method of indicating the content of a message element, such as indicating a dual transfer mode handover command in an existing message, in particular to provide improved indication of dual transfer mode (DTM) handover command for general packet radio service (GPRS) enhanced data rates for global system for mobile communication (GSM) evolution (EDGE) DTM handover.

DTM handover is a recently developed procedure designed to allow a mobile phone, which currently has allocated dedicated, i.e. circuit-switched (CS), resources and also allocated packet switched (PS) resources, to be handed over to a new cell. The procedure makes use of existing procedures for handover of the CS resources and the PS resources in parallel.

As illustrated in FIGS. 1 and 2, a source base station subsystem (BSS) 1 initiates the handover by sending two requests, one relating to the circuit switched resources, which is sent to a CS core network 3 and the other relating to the PS resources, sent to a PS core network 7. These requests are forwarded through each respective core network to a target BSS 5.

Included in the requests are indications that the requests form part of a DTM handover procedure, so that the target BSS 5 knows, on receiving the first request, to wait for the second request before allocating resources.

Normally, the target BSS allocates both PS and CS resources and constructs a 'DTM Handover Command' message, which is sent back to the source BSS 1 via both core networks 3, 7, so that the source BSS receives two copies of the message, encapsulated within the appropriate message.

However, if there is a problem such as delay or loss in the core network meaning only one request is received, or there is a lack of resources available, then the target BSS 5 may end up allocating only resources in one domain, either PS or CS. If only CS resources are allocated, the target BSS constructs a 'Handover Command' message, and sends that back to the source BSS 1 via the CS core network 3.

In order to ensure there is no impact on the core network nodes, the mobile switching centre (MSC) and the serving GPRS support node (SGSN), the existing message flows for CS and PS Handover are used within the respective domains. Normally, new information elements could easily be added to an existing message, identified by a information element identifier (IEI). However, in the case of CS Handover, some existing information elements (including specifically that which encapsulates the 'Handover Command' message which is to be sent over the air to the mobile station) are handled in a very specific way by the core network—specifically, these information elements are not examined by the core network, but are passed 'transparently' from the target BSS to the source BSS. This same treatment by the core network is required for the corresponding 'DTM Handover Command' message used in DTM Handover. It is therefore desired that, to minimize the changes needed to the core network, the message which is sent to the mobile station in the case of DTM Handover is contained within an IE which is identified by the same IEI as that which is used to carry the air interface "Handover Command" used in legacy CS handovers.

However, at the source BSS, it may be very difficult, if not impossible, to determine whether the content of the IE relates to a CS handover or a DTM Handover, and therefore to distinguish between an acknowledgement message from the CS core network which contains a DTM Handover Command, and one which contains a (CS only) Handover Command. Since these messages are processed in very different ways, the source BSS needs to know which message is included in order for the handover to proceed.

In some circumstances it is possible for the source BSS to infer which message is included, e.g. in the successful case, if positive acknowledgements are received from both PS and CS domains, then these will both contain a DTM Handover Command. However, in cases where only one message, from the CS core network, is received by the source BSS 1, it is not possible to determine which type of message has been received. The one message may be from the case where a DTM Handover has resulted in a CS-only handover, and may not necessarily be a failure case.

It is also not possible to infer the content if a positive acknowledgement is received in the CS domain, and a negative acknowledgement is received in the PS domain, which indicates by a 'cause' value, that no resources were reserved by the target BSS in that domain. Other failure cases include where no PS message is received, or where the PS message indicates failure in the PS core network, but no solution to these problems has been proposed to date.

SUMMARY

Accordingly, a method of indicating the content of a message element by providing an indicator outside that message element is described below.

The method is able to signal the content of one IE by another IE elsewhere, thereby having no impact on the core network nodes, but ensuring that the source BSS knows whether the message it has received contains a DTM Handover Command.

The message element may include an identification part and a content part.

Optionally, the message element further includes a length part.

The indicator may include a specified sequence of bits sent in the same message element.

Alternatively, the indicator includes a specified sequence of bits sent in a different message element.

The message element may be a field element, or information element which is part of a message sent between devices in a 3GPP network.

The indicator may indicate the presence of a dual transfer mode handover command in an existing message element, and the method includes sending an indication in another message element of the presence of the dual transfer mode handover command in the existing message element.

The indication may include one or more extra bits in another information element.

The other information element may be a New BSS to Old BSS Information information element.

The New BSS to Old BSS Information information element may be contained within a BSSMAP Handover Command.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
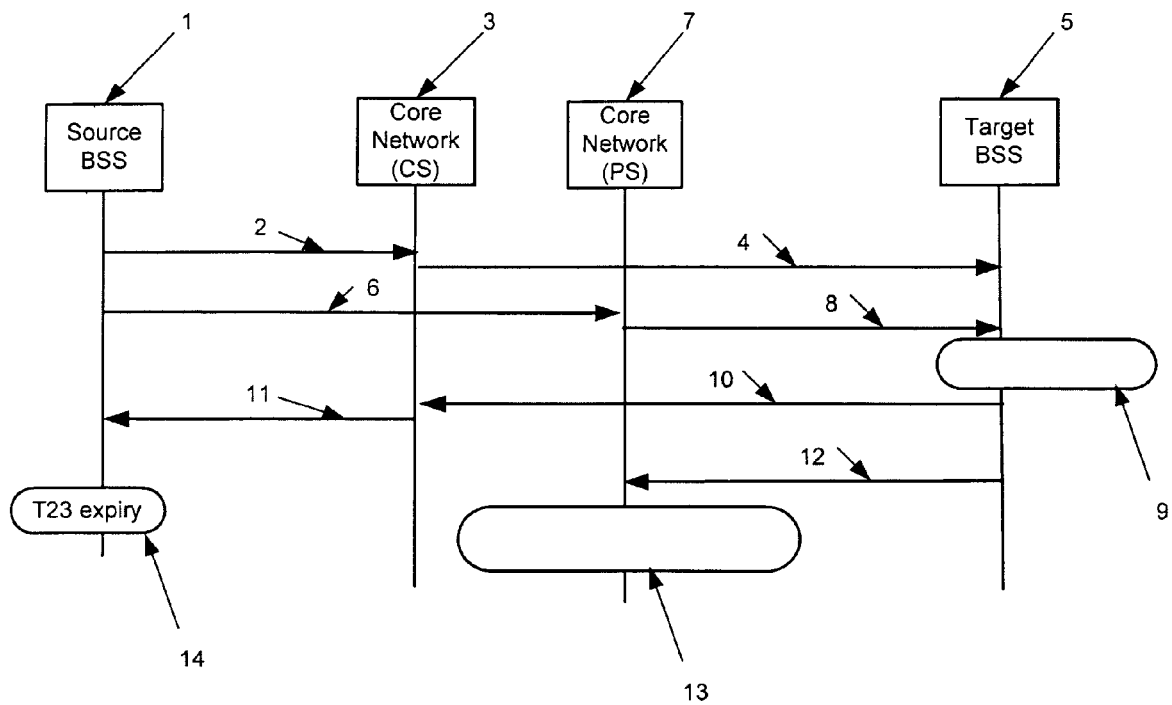
FIG. 1 is a message sequence chart of for dual transfer mode handover with a failure in the return path.

Reference will now be made in detail to the exemplary embodiments which are illustrated in the accompanying drawings, wherein like reference numerals refer to like elements throughout.

FIG. 1 shows a message sequence chart in which a source BSS 1 sends a Handover Required message 2 to a CS core network 3. The CS core network sends a Handover Request 4 to a target BSS 5. Similarly, the source BSS 1 sends a PS Handover Required message 6 to a PS core network 7, which sends a PS Handover Request 8 to the target BSS 5. When the CS and PS resources have been allocated 9 by the target BSS, the target BSS sends back a Handover Request acknowledgement 10 to the CS core network which sends a BSSMAP Handover Command 11 to the source BSS. The target BSS also sends a PS Handover Request acknowledgement 12. These messages 10, 11, 12 all contain a DTM Handover Command message, since both CS and PS resources were allocated. However, due to some delay, or failure, 13 in the PS domain, no message is sent on from the PS core network 7 within a predetermined time, T23 expiry, 14.

Figure 2:
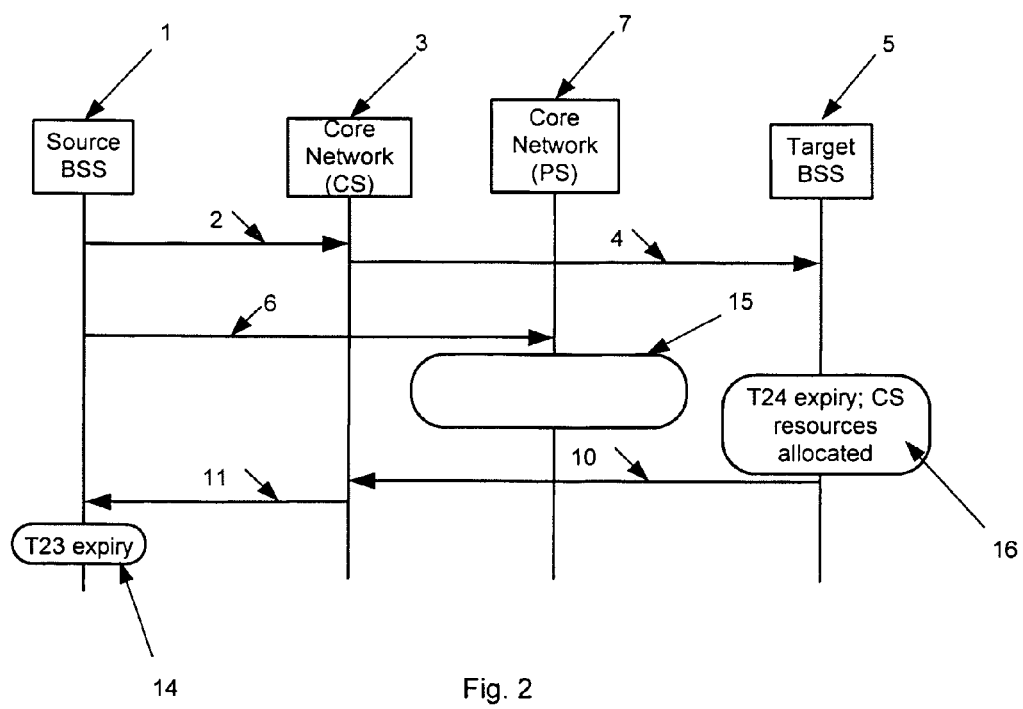
FIG. 2 is a message sequence chart for dual transfer mode handover with a failure in the return path; and, FIG. 3 is a block diagram illustrating an example of a BSSMAP Handover Command message.

FIG. 2 illustrates another example of message failure. The source BSS 1 sends the Handover Required message 2 to the CS core network 3, which sends on the Handover Request 4 to the target BSS 5. The source BSS also sends the PS Handover Required message 6, but due to a delay, or failure 15 in the PS domain 15, a time limit is exceeded and at T24 expiry, the target BSS allocates 16 only CS resources, then sends back the Handover Request acknowledgement 10 to the core network 3, which sends a BSSMAP Handover Command 11 before T23 expiry 14. The messages 10, 11 contain a Handover Command message, as only CS resources were allocated.

The present invention adds an information element to an existing 'transparent container' to indicate that the content of the IE, which may not be known, is in fact a DTM Handover Command. The absence of the newly defined IE indicates that a Handover Command message for CS only; this corresponds to legacy behavior in the case of a CS-only handover command and is thus backwards-compatible.

Figure 3:
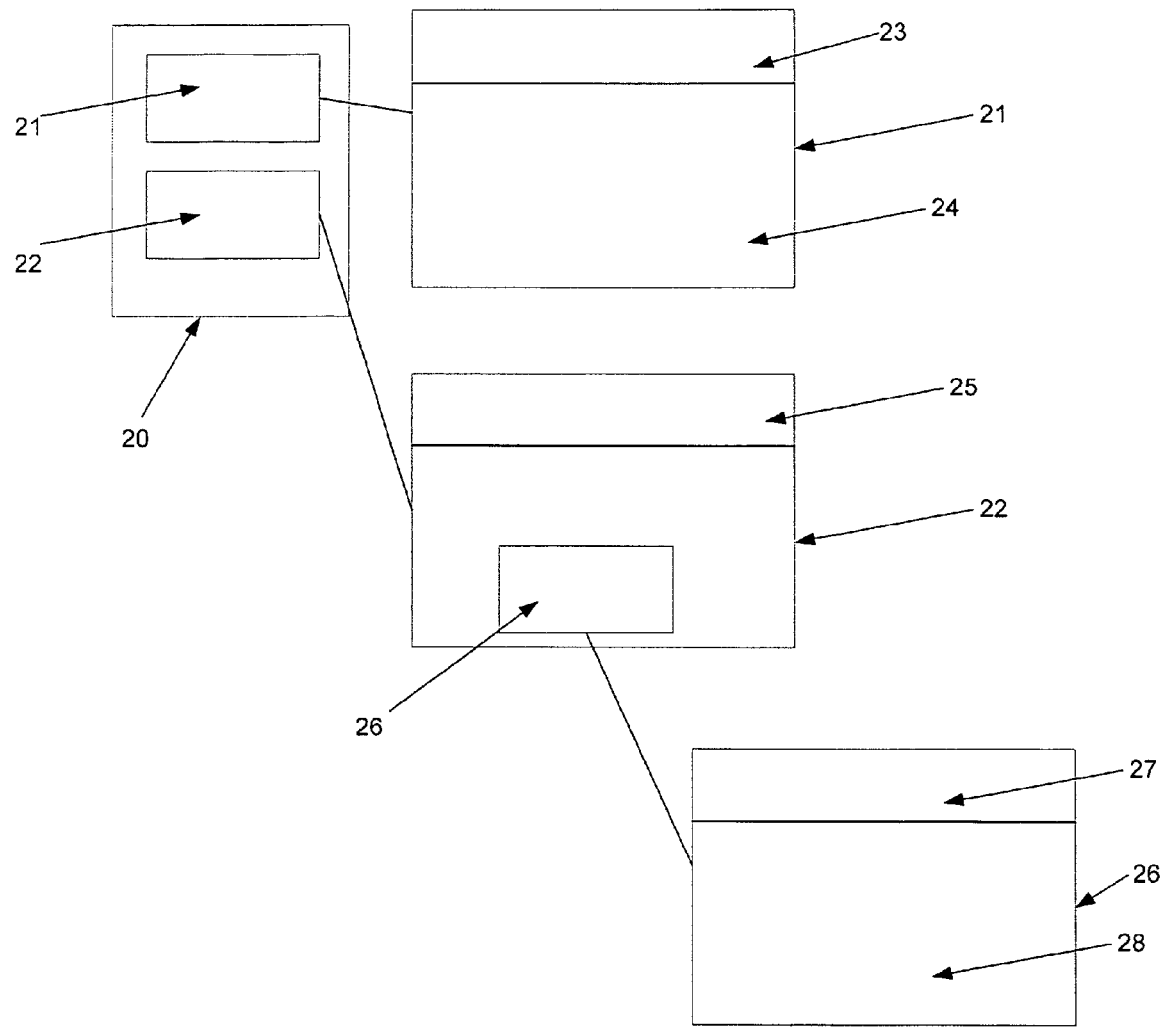

An example of a BSSMAP Handover Command message is illustrated in FIG. 3. The Handover Command message is sent from a mobile station controller (MSC) to the base station subsystem BSS and contains the target channel to which the mobile station (MS) should retune.

FIG. 3 shows the BSSMAP Handover Command 20 which is made up message elements (referred to as Information Elements) and includes a layer 3 Information information element (IE) 21 and a New BSS to Old BSS Information message 22. The layer 3 information IE includes an information element identifier (IEI) 23, length information and content 24, which may be a Handover Command, or a DTM Handover Command. The New BSS to Old BSS Information information element 22 also has an IEI 25 and may contain a DTM Handover Command Indication message 26. The DTM Handover Command Indication message 26 has an IEI 27 and optional content 28. In the New BSS to Old BSS Information message 22, the presence or absence of the Indication message 26 can be used to indicate the content of the layer 3 Information IE, or else some specific content 28 within the Indication message 26 can be provided for this purpose.

Table 1 below refers to what is shown in FIGS. 1 and 2 as the (BSSMAP) Handover Command, which is not the same as the Handover Command, which could be inside the Layer 3 Information IE. The Layer 3 Information contains either the DTM Handover Command or the Handover Command. Normally, the contents of an IE are identified by the value of the IEI. However, since in this case, they are both identified by the same IEI (that of the Layer 3 Information IE), the source BSS can not determine the contents of the Layer 3 Information IE by this method.

In some cases it is possible to determine the contents by the type of procedure which is ongoing e.g. Handover to another GSM cell, or Handover to a UMTS (UTRAN) cell. In the case of DTM Handover, although the old BSS may have initiated a DTM Handover procedure, the new BSS may have modified this to be only a CS handover (i.e. without any PS domain resources being allocated in the target cell). Therefore the old BSS is not aware of exactly which procedure is ongoing in this case.

TABLE 1

| INFORMATION ELEMENT | REFERENCE | DIRECTION | TYPE | LEN |
|---|---|---|---|---|
| Message Type | 3.2.2.1 | MSC-BSS | M | 1 |
| Layer 3 Information | 3.2.2.24 | MSC-BSS | M (note 1) | 11-n |
| Cell Identifier | 3.2.2.17 | MSC-BSS | O | 3-10 |
| New BSS to Old BSS Information | 3.2.2.80 | MSC-BSS | O (note 2) | 2-n |

NOTE 1:
This information element carries a radio interface message. In the case of an Intersystem handover to UMTS, this information element contains a HANDOVER TO UTRAN COMMAND message as defined in 3GPP TS 25.331. In the case of an Inter BSC handover, it contains an RR HANDOVER COMMAND message as defined in 3GPP TS 44.018. In the case of an Intersystem handover to cdma2000, this information element contains the HANDOVER TO CDMA2000 COMMAND message, as defined in 3GPP TS 44.018.
NOTE 2:
This information element may be included if received from the target BSS or the target system. Its contents shall be equal to the received element.

However, the New BSS to Old BSS Information IE is further divided into subsections referred to as 'Field Elements' as described in the following extract from the 3GPP TS 48.008 standard document: 3.2.2.80 New BSS to Old BSS Information. This information element is defined as a general container for passing field elements transparently between BSSs via the MSC.

These field elements are passed in the New BSS to Old BSS information elements field. The error handling performed by the receiving entity for the New BSS to Old BSS information elements field is that specified in sub-clause 3.1.19.7.

TABLE 2

| 8 | 7 | 6 | 5 | 4 | 3 | 2 | 1 | |
|---|---|---|---|---|---|---|---|---|
| Element identifier | | | | | | | | octet 1 |
| Length | | | | | | | | octet 2 |
| New BSS to Old BSS information elements | | | | | | | | octet 3-n |

The length indicator (octet 2) in Table 2 is a binary number indicating the absolute length of the contents after the length indicator octet and may be set to zero. The New BSS to Old BSS information elements field is made up of 0 or more field elements listed in Table 3. Field elements may occur in any order in the Old BSS to New BSS information elements field. The construction of the Field Elements allows the receiver to ignore unknown Field Elements.

Reception of an erroneous New BSS to Old BSS information IE shall not cause a rejection of the HANDOVER COMMAND or HANDOVER FAILURE messages. In that case, the New BSS to Old BSS information IE shall be discarded and the handover procedure shall continue.

TABLE 3

| FIELD ELEMENT | REFERENCE | LEN |
| --- | --- | --- |
| Downlink Cell Load Information | 3.2.3.9 | 6 |
| Uplink Cell Load Information | 3.2.3.10 | 6 |

It is possible to add an additional field element to this IE to indicate that the contents of the Layer 3 Information IE was the DTM Handover Command, rather than the Handover Command, as shown in Table 4.

TABLE 4

| FIELD ELEMENT | REFERENCE | LEN |
| --- | --- | --- |
| Downlink Cell Load Information | 3.2.3.9 | 6 |
| Uplink Cell Load Information | 3.2.3.10 | 6 |
| DTM Handover Command Information | 3.2.3.xx | 3 |

Without this addition to the procedure, the source BSS must in some cases abort the handover because it cannot determine what type of message it has received. This makes it less reliable than, for example, a CS-only handover.

This invention allows the source BSS to determine the type of message received and to choose to proceed with the handover in cases where it would not otherwise have been possible. This also has a benefit compared with the existing (or alternative) mechanism using 'cause' values, since the method of the present invention is simpler than the source BSS having to know which cause values indicate the contents of the message, and the invention is more future-proof, since these cause values may change in the future.

One example of the DTM Handover Command Information element is defined as follows:

The presence of this field element in the New BSS to Old BSS Information IE indicates that an (RLC/MAC) DTM HANDOVER COMMAND message is included within the Layer 3 Information IE carried within the same BSSMAP message.

| 8 | 7 | 6 | 5 | 4 | 3 | 2 | 1 | |
| --- | --- | --- | --- | --- | --- | --- | --- | --- |
| | | Field Element identifier | | | | | | octet 1 |
| | | Length | | | | | | octet 2 |
| | | Spare | | | | | | octet 3 | where the 'field elements' and 'information elements' are, for the purposes of this description, equivalent terms and denote constituent elements of a larger structure. 'Spare' bits allow further uses to be defined in future, although at present they are defined to be all zero.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method of indicating content of a first message element, comprising:
providing an indicator outside the first message element, wherein the providing includes sending an indication in a second message element that is a New Base Station Subsystem (BSS) to Old BSS Information information element contained within a BSSMAP Handover Command.

2. The method according to claim 1, wherein the first message element has an identification part and a content part.

3. The method according to claim 2, wherein the first message element further includes a length part.

4. The method according to claim 3, wherein the indicator is associated with a specified sequence of bits sent in the first message element.

5. The method according to claim 4,
wherein the indicator indicates presence of a dual transfer mode handover command in an existing message element,
said providing including sending an indication in the second message element of the presence of the dual transfer mode handover command in the first message element.

6. The method according to claim 5, wherein the indication comprises at least one extra bit in the second message element.

7. The method according to claim 3, wherein the indicator includes a specified sequence of bits sent in a second message element different from the first message element.

8. The method according to claim 5, wherein the first message element is a field element, or an information element which is part of a message sent between devices in a 3 GPP network.

* * * * *